United States Patent
Mielenz et al.

(10) Patent No.: US 11,242,063 B2
(45) Date of Patent: Feb. 8, 2022

(54) METHOD AND DEVICE FOR OPERATING A FIRST VEHICLE

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 16/330,874

(22) PCT Filed: Aug. 2, 2017

(86) PCT No.: PCT/EP2017/069524
§ 371 (c)(1),
(2) Date: Mar. 6, 2019

(87) PCT Pub. No.: WO2018/046189
PCT Pub. Date: Mar. 15, 2018

(65) Prior Publication Data
US 2019/0185007 A1    Jun. 20, 2019

(30) Foreign Application Priority Data

Sep. 8, 2016  (DE) .......................... 102016217079.1

(51) Int. Cl.
*B60W 40/02*    (2006.01)
*G01S 7/02*     (2006.01)
(Continued)

(52) U.S. Cl.
CPC ............ *B60W 40/02* (2013.01); *B60W 50/00* (2013.01); *G01S 7/003* (2013.01); *G01S 7/023* (2013.01);
(Continued)

(58) Field of Classification Search
CPC ...... B60W 40/00; B60W 40/02; B60W 50/00; B60W 50/04; B60W 50/045;
(Continued)

(56) References Cited

U.S. PATENT DOCUMENTS 6,047,234 A * 4/2000 Cherveny .............. G01C 21/32
701/451
9,684,836 B1 * 6/2017 Ferguson ............. G05D 1/0088
(Continued)

FOREIGN PATENT DOCUMENTS

DE     102011083039 A1    3/2013

OTHER PUBLICATIONS

International Search Report dated Nov. 7, 2017 of the corresponding International Application PCT/EP2017/069524 filed on Aug. 2, 2017.

*Primary Examiner* — Geepy Pe
*Assistant Examiner* — Michael Allen Brace, Jr.
(74) *Attorney, Agent, or Firm* — Norton Rose Fulbright US LLP; Gerard Messina

(57) ABSTRACT

In a method and a device for operating a first vehicle, a method includes receiving a signal from an external processing unit for influencing a first surroundings sensor system of the first vehicle, influencing the first surroundings sensor system dependent on the received signal, receiving surroundings data values detected by at least one second surroundings sensor system of a second vehicle and that at least partially represent surroundings of the first vehicle, and operating the first vehicle dependent on the influence of the first surroundings sensor system and the received surroundings data values.

14 Claims, 4 Drawing Sheets

(51) Int. Cl.
    *G01S 13/931*    (2020.01)
    *G01S 7/00*      (2006.01)
    *G08G 1/16*     (2006.01)
    *B60W 50/00*    (2006.01)
    *B60W 50/04*    (2006.01)

(52) U.S. Cl.
    CPC ............ *G01S 13/931* (2013.01); *G08G 1/164* (2013.01); *G08G 1/166* (2013.01); *B60W 2050/0075* (2013.01); *B60W 2050/046* (2013.01); *B60W 2420/42* (2013.01); *B60W 2420/52* (2013.01); *B60W 2556/45* (2020.02); *B60W 2556/55* (2020.02); *G01S 2013/9316* (2020.01); *G01S 2013/9322* (2020.01); *G01S 2013/9323* (2020.01); *G01S 2013/9324* (2020.01); *G01S 2013/93271* (2020.01); *G01S 2013/93272* (2020.01); *G08G 1/16* (2013.01)

(58) Field of Classification Search
    CPC ... B60W 2050/046; B60W 2050/0062; B60W 2050/0075; B60W 2050/0077; B60W 2050/0079; B60W 2420/00; B60W 2420/42; B60W 2420/52; G01S 7/00; G01S 7/003; G01S 7/023; G01S 13/00; G01S 13/88; G01S 13/93; G01S 13/931; G01S 2013/9322; G01S 2013/9323; G01S 2013/9316; G01S 2013/93271; G01S 2013/9324; G01S 2013/93272; G08G 1/00; G08G 1/16; G08G 1/164; G08G 1/166

See application file for complete search history.

(56) References Cited

U.S. PATENT DOCUMENTS

| | | | |
|---|---|---|---|
| 9,711,050 B2 * | 7/2017 | Ansari | G06Q 40/08 |
| 2014/0358412 A1 * | 12/2014 | Fausten | G08G 1/16 701/117 |
| 2016/0061935 A1 | 3/2016 | McCloskey et al. | |
| 2017/0166217 A1 * | 6/2017 | Sbianchi | H04B 1/1036 |
| 2017/0166219 A1 * | 6/2017 | Jammoussi | B60W 50/045 |
| 2018/0053403 A1 * | 2/2018 | Wieskamp | H04L 47/14 |

\* cited by examiner

METHOD AND DEVICE FOR OPERATING A FIRST VEHICLE

CROSS-REFERENCE TO RELATED APPLICATIONS

The present application is the national stage of International Pat. App. No. PCT/EP2017/069524 filed Aug. 2, 2017, and claims priority under 35 U.S.C. § 119 to DE 10 2016 217 079.1, filed in the Federal Republic of Germany on Sep. 8, 2016, the content of each of which are incorporated herein by reference in their entireties.

FIELD OF THE INVENTION

The present invention relates to a method and to a device for operating a first vehicle, a signal is received, a surroundings sensor system is influenced, surroundings data values are received, and the first vehicle is operated dependent on the influence and the received surroundings data values.

SUMMARY

According to an example embodiment of the present invention, a method for operating a first vehicle includes a step of receiving a signal from an external processing unit for influencing a first surroundings sensor system of the first vehicle, a step of influencing the first surroundings sensor system depending on the received signal, a step of receiving surroundings data values which at least partially represent surroundings of the first vehicle and that were detected by at least one second surroundings sensor system of a second vehicle, and a step of operating the first vehicle dependent on the influence of the first surroundings sensor system and the received surroundings data values.

An advantage of the method described here is that a detection of the surroundings of a vehicle takes place without the detection being interfered with by the surroundings sensor systems of other vehicle systems. Moreover, this method contributes to the robustness and functional capability of such vehicle systems. This results in an advantageous influence of road safety, both for the vehicle whose surroundings sensor system is changed according to the method presented here, and for all other vehicles involved in the method.

A possible disruption of a surroundings sensor system by another surroundings sensor system can take place, for example, due to the fact that radar sensors are utilized for detecting the surroundings and the radar waves are superimposed onto one another in such a way that a destructive disruption of the radar waves results and, therefore, the one surroundings sensor system as well as the other surroundings sensor system receive a poorer signal.

Preferably, the method includes one further step of transmitting sensor data values, which represent an effect of the influence of the first surroundings sensor system dependent on the received signal, to the external processing unit.

This advantageously permits a better and/or more complete and/or more extensive and/or faster surroundings detection.

Preferably, the at least one second surroundings sensor system is identical to the first surroundings sensor system. "Identical" is intended to mean, in this case, that the first surroundings sensor system and the second surroundings sensor system are designed in such a way that they are comparable to one another. This can relate to the sensor type of the particular surroundings sensor system as well as to the size and/or the range and/or the power and/or other comparison features. For example, two sensors can be identical when both sensors are a video sensor or the two sensors can be identical when they are capable of detecting the same surroundings according to comparable criteria. Under no circumstances is "identical" intended to exclusively mean that the sensors are to be of the same make (manufacturer, serial number, etc.).

Herein lies an advantage that the first surroundings sensor system and the second surroundings sensor system can be quickly and reliably compared to one another, which benefits the entire method, since this increases the reliability and significance of the method.

In a preferred example embodiment, the influence of the first surroundings sensor system takes place in that the first surroundings sensor system is at least partially switched off.

Herein lies an advantage that the interfering effect of individual sensors is reduced and/or completely suppressed, which, overall, permits a best possible detection of the surroundings.

In a preferred example embodiment, the signal for influencing the first surroundings sensor system depends on a comparison with the at least one second surroundings sensor system carried out according to predefined criteria. This advantageously permits a determination of the signal, adapted to the particular surroundings sensor system in the best possible way. As a result, the control of the first surroundings sensor system and/or the second surroundings sensor system can take place in combination with an ideal adaptation to the interaction of the particular sensors which are utilized.

Particularly preferably, the comparison is carried out according to predefined criteria in such a way that a quality of the first surroundings sensor system and the at least one second surroundings sensor system is taken into account.

The determination of the quality of the first surroundings sensor system and the second surroundings sensor system is particularly advantageous, since this assessment of the surroundings sensor systems, and the subsequently carried-out method that is dependent on the assessment, permit a best possible surroundings detection of the surroundings of all involved vehicles.

Preferably, the quality of the first surroundings sensor system and the at least one second surroundings sensor system is taken into account depending on the transmitted sensor data values.

According to an example embodiment of the present invention, a device for operating a first vehicle includes first receiving means for receiving a signal from an external processing unit for influencing a first surroundings sensor system of the first vehicle. Moreover, the device includes influencing means for influencing the first surroundings sensor system dependent on the received signal and second receiving means for receiving surroundings data values that at least partially represent surroundings of the first vehicle and that were detected by at least one second surroundings sensor system of a second vehicle. Moreover, vehicle systems for operating the vehicle dependent on the influence of the first surroundings sensor system and the received surroundings data values are provided.

In a preferred example embodiment, the first receiving means and/or the influencing means and/or the second receiving means and/or the vehicle systems are/is designed for carrying out a method as described herein.

Preferably, the device further includes transmission means for transmitting to the external processing unit sensor data values that represent an effect of the influence of the first surroundings sensor system depending on the received signal.

Example embodiments of the present invention are represented in the drawings and are explained in greater detail in the following descriptions, and advantageous refinements of the present invention can be understood from the following description and the claims.

DETAILED DESCRIPTION

Figure 1:
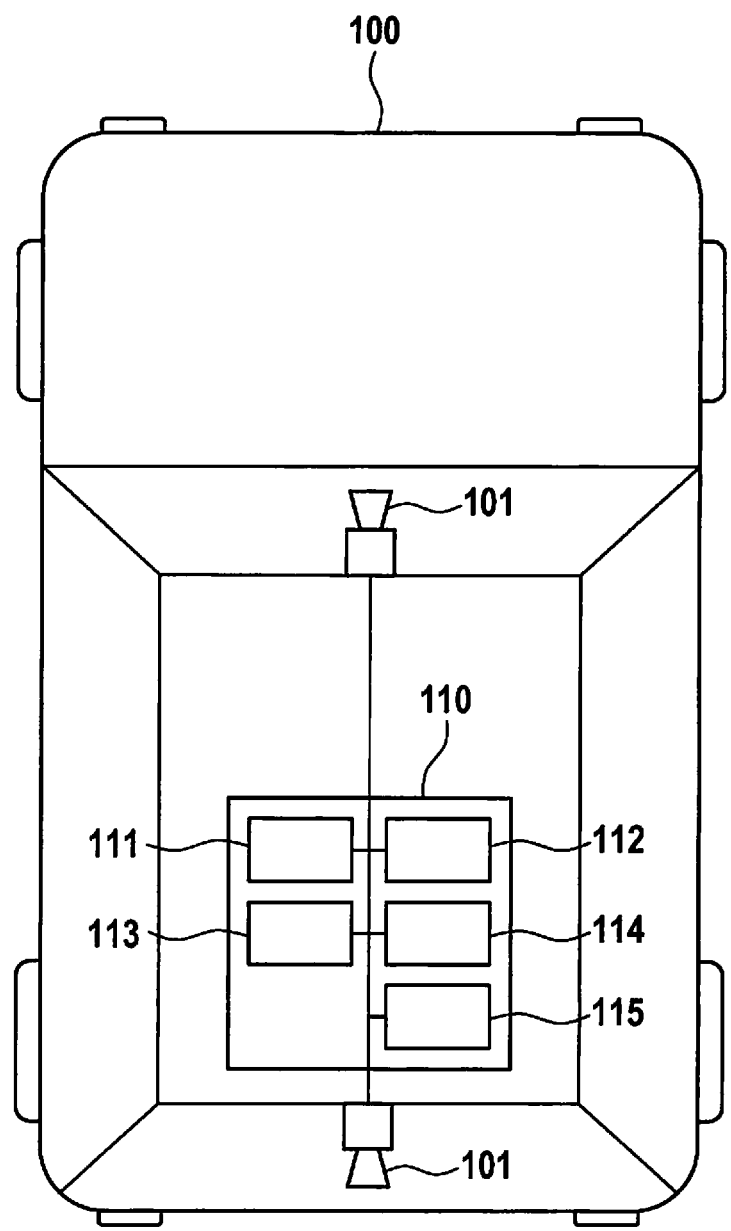
FIG. 1 shows a vehicle that includes a device for carrying out a method according to an example embodiment of the present invention.

FIG. 1 shows a first vehicle 100 that includes device 110. Moreover, first vehicle 100 includes a first surroundings sensor system 101, which is shown here, by way of example, as a video sensor having a detection unit toward the front and toward the rear. This can even be, for example, a radar sensor and/or a LIDAR sensor and/or an ultrasonic sensor. In general, first surroundings sensor system 101 can be any number of sensors and any type of sensor which are suitable for detecting the surroundings of first vehicle 100.

Device 110 includes receiving means 111 for receiving a signal as well as influencing means 112 for influencing first surroundings sensor system 101 and second receiving means 113 for receiving surroundings data values. Moreover, first vehicle 100 includes vehicle systems 114 for operating first vehicle 100 and transmission means 115 for transmitting sensor data values.

First receiving means 111 are designed to be capable of receiving a control signal from an external processing unit 300 and forwarding the control signal to influencing means 112.

Influencing means 112 are designed in such a way that they convert a control signal forwarded by first receiving means 111, in order to activate and influence first surroundings sensor system 101 of first vehicle 100. In this case, the manner of the influence depends, on the one hand, on the control signal and, on the other hand, on the surroundings sensor system itself, such as on the model and/or the performance and/or the sensor type and/or the arrangement on the vehicle and/or the size and/or the state and/or further sensor-related features.

Figure 2:
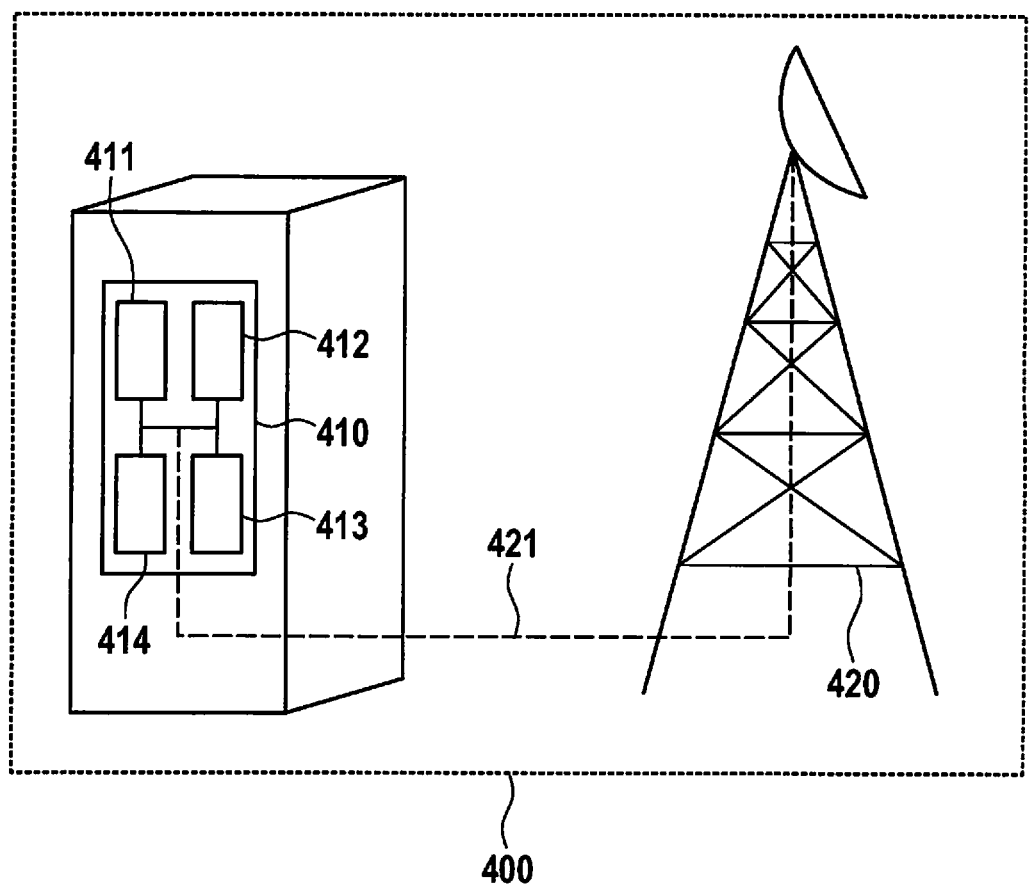
FIG. 2 shows an external server according to an example embodiment of the present invention.

FIG. 2 shows an external processing unit 400 that includes a device 410 including receiving means 411, evaluation means 413, and transmission means 414. In this case, receiving means 411 can even be designed together with transmission means 414 as a single transceiver. In this case, receiving means 411 as well as transmission means 414 can be designed in such a way that they—individually or, as described above, in the form of a single unit—can be capable of directly transmitting and/or receiving or can even be connected, with the aid of linking means 421, to one further transceiver station 420 which is designed, for example, for transmitting and/or receiving across great distances.

Moreover, device 410 includes evaluation means 413 designed for evaluating the quality of first surroundings sensor system 101 of first vehicle 100 and the quality of second surroundings sensor system 201 of second vehicle 200. In this case, evaluation means 413 include, for example, a processor and/or a hard drive and/or a working memory which are/is designed for carrying out the evaluation of the quality of first surroundings sensor system 101 of first vehicle 100 and the evaluation of the quality of second surroundings sensor system 201 of second vehicle 200 with the aid of at least one computer program. In this case, this evaluation is carried out in such a way, for example, that the first surroundings data values are combined with the second surroundings data values and, on the basis thereof, new third surroundings data values are formed, which represent shared surroundings of first vehicle 100 and of second vehicle 200.

This can take place, for example, in that these third surroundings data values are compared with data samples which have already been stored. On the basis of this comparison, an evaluation of the quality of first surroundings sensor system 101 of first vehicle 100 and the quality of second surroundings sensor system 201 of second vehicle 200 is subsequently carried out with the aid of predefined comparison criteria.

In an example embodiment, the quality of first surroundings sensor system 101 of first vehicle 100 and the quality of second surroundings sensor system 201 of second vehicle 200 are determined, in that a first piece of information of first surroundings sensor system 101 is compared to a second piece of information of second surroundings sensor system 201. In so doing, technical features can be read out, for example, from the first and the second pieces of information, which indicate that first surroundings sensor system 101 of first vehicle 100 or second surroundings sensor system 201 of second vehicle 200 is better suited for detecting surroundings data values.

Figure 3:
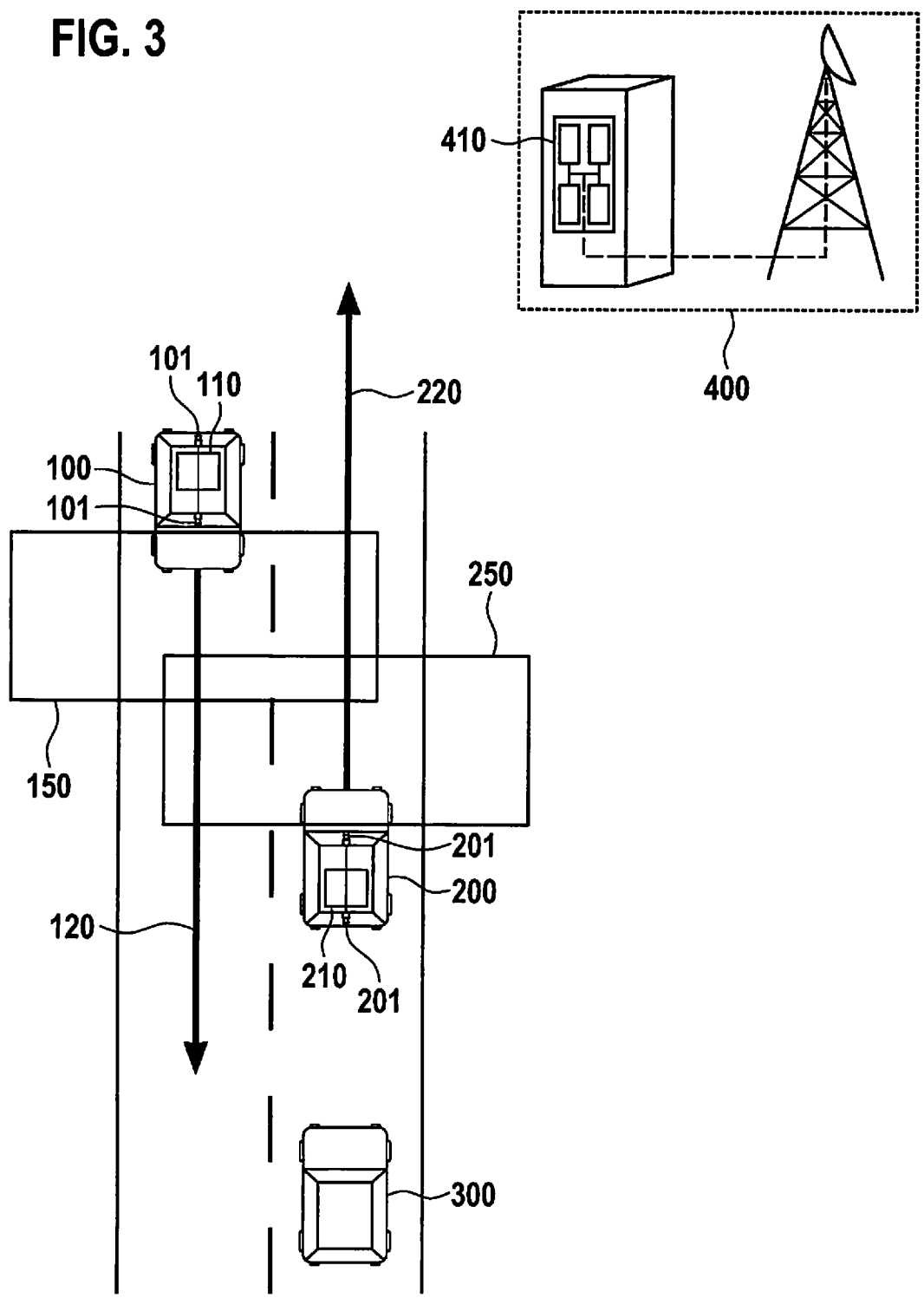
FIG. 3 shows an implementation of a method according to an example embodiment of the present invention.

FIG. 3 shows an example implementation of the method according to the present invention, in that a situation is shown, in which this method is utilized and which is representative for further examples. In this case, a first vehicle 100 is shown, which detects surroundings 150 of first vehicle 100 using its surroundings sensor system 101. Moreover, a second vehicle 200 is shown, which likewise detects surroundings 250 of second vehicle 200 using its surroundings sensor system 201. In the example shown here, there is an overlap between detected surroundings 150 of first vehicle 100 and detected surroundings 250 of second vehicle 200. In addition, a third vehicle 300 is shown, which is located in spatial proximity of first vehicle 100 and second vehicle 200. A section of trajectories 120, 220 of first vehicle 100 and of second vehicle 200, respectively, are shown here, by way of example, with the aid of arrows. Moreover, external processing unit 400 is shown, which includes device 410 according to the present invention.

Due to the overlap of surroundings 150, 250 detected by first vehicle 100 and second vehicle 200, respectively, the detection of the surroundings within the overlap area can be worsened for both vehicles 100, 200, since surroundings sensor system 101 of first vehicle 100 and surroundings sensor system 201 of second vehicle 200 disruptively influence each other in this area. Since first vehicle 100 as well as second vehicle 200 are each equipped with a transceiver in this example, both vehicles transmit surroundings data values to external processing unit 400 which represent, on the one hand, first surroundings 150 of first vehicle 100 and, on the other hand, second surroundings 250 of second vehicle 200. External processing unit 400 can now receive the surroundings data values transmitted by first vehicle 100 and second vehicle 200 using device 410 and the means encompassed by device 410 and carry out an evaluation of the quality of first surroundings sensor system 101 and second surroundings sensor system 201 using a suitable evaluation means.

After the evaluation of first and second surroundings sensor systems, a signal for influencing first surroundings sensor system 101 and/or second surroundings sensor system 201 can be transmitted to first vehicle 100 and/or second vehicle 200. Thereupon, improved surroundings data values, which represent surroundings 150 of first vehicle 101 and surroundings 250 of second vehicle 200, can be detected and transmitted to external processing unit 400 again.

Thereafter, originating from external processing unit 400, the improved surroundings data values can be transmitted to first vehicle 100 and/or to second vehicle 200 and/or to the at least one further third vehicle 300.

Due to the transmitted improved surroundings data values, first vehicle 100 can now be operated, for example, in such a way that the previously insufficiently detected area, which was overlapped by first surroundings sensor system 101 of first vehicle 100 as well as by second surroundings sensor system 201 of second vehicle 200, is appropriately taken into account for one or multiple driving functions. For example, a necessary evasive maneuver can be initiated, since an object is located within the overlap area.

The situation shown here, in which a first vehicle 100 is approaching a second vehicle 200 from the opposite direction, and a third vehicle 300 is located behind second vehicle 201, is selected purely by way of example. One further example, in which the method described here is advantageously utilized, is within a locality at an intersection. The disruptive overlap of a first surroundings sensor system 101 of a first vehicle 100 and a second surroundings sensor system 201 of a second vehicle 200 can be particularly dramatic in this case when, for example, an object, such as a pedestrian or a cyclist, which is not detected due to the overlap, is located in this overlap area. External processing unit 400 can be, for example, a component of the road infrastructure, such as a traffic light or a streetlight, in this case.

Figure 4:
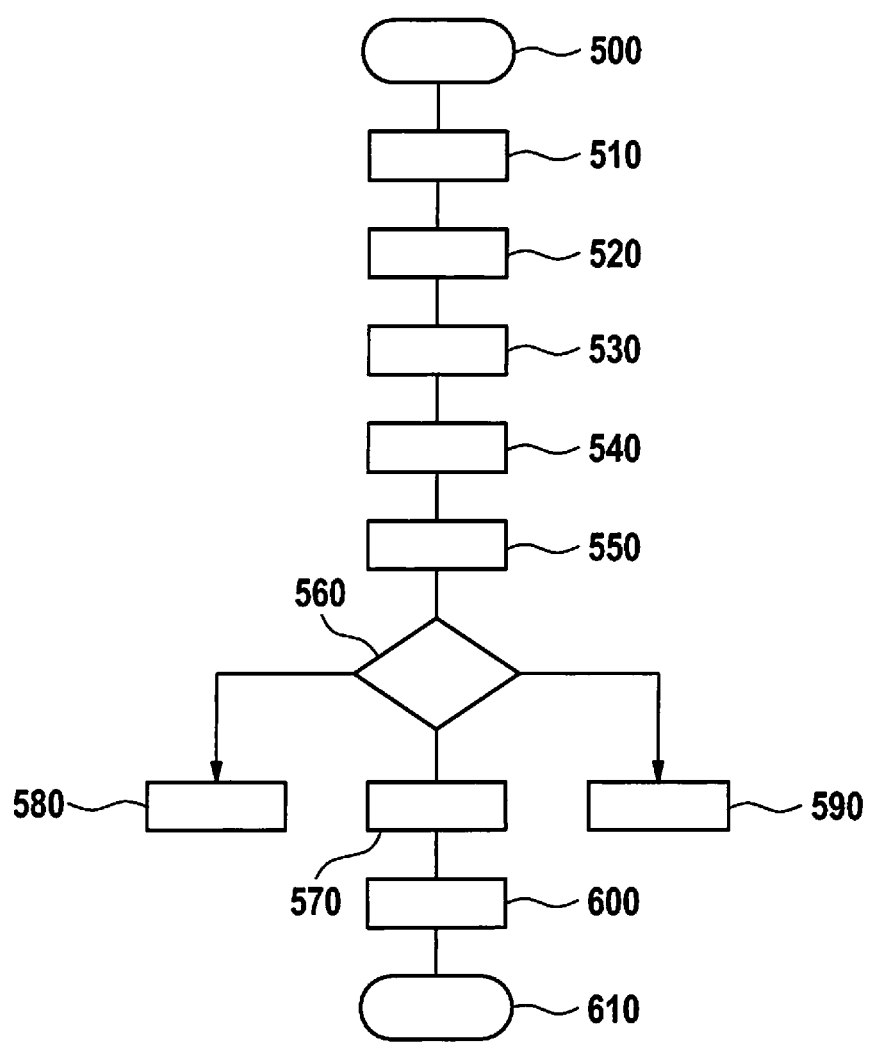
FIG. 4 is a flowchart that illustrates a method according to an example embodiment of the present invention.

FIG. 4 illustrates an example embodiment based on a flowchart. The method begins in step 500. In step 510, first vehicle 100 receives a signal for influencing—for example, for switching off—first surroundings sensor system 101. In step 520, first surroundings sensor system 101 of first vehicle 100 is switched off.

In step 530, second vehicle 200 detects surroundings data values using second surroundings sensor system 201, where first surroundings sensor system 101 can no longer disruptively affect the detection carried out by second surroundings sensor system 201. In step 540, second vehicle 200 transmits detected surroundings data values to external processing unit 400.

In step 550, external processing unit 400 receives the detected surroundings data values. In step 560, external processing unit 400 transmits detected surroundings data values to first vehicle 100, to second vehicle 200, and to at least one further vehicle 300.

In step 570, first vehicle 100 receives the detected surroundings data values. In step 580, second vehicle 200 receives the detected surroundings data values. In step 590, the at least one further vehicle 300 receives the detected surroundings data values.

In step 600, the first vehicle is operated dependent on the detected surroundings data values. The method ends in step 610.

What is claimed is:

1. A method for operating a first vehicle, the method comprising:
   receiving a signal from an external processing unit for influencing a first surroundings sensor system of the first vehicle;
   influencing the first surroundings sensor system based on the signal;
   receiving surroundings data values detected by at least one second surroundings sensor system of a second vehicle and that at least partially represent surroundings of the first vehicle; and
   operating the first vehicle dependent on the influence of the first surroundings sensor system and received surroundings data values;
   wherein evaluation of a quality of the first surroundings sensor system and of the second surroundings sensor system includes combining first surroundings data values with second surroundings data values, and forming based thereon, third surroundings data values that represent shared surroundings of the first vehicle and of the second vehicle,
   wherein the influencing includes switching off the first surroundings sensor system, so that the first surroundings sensor system does not disruptively affect detection carried out by the second surroundings sensor system, and
   wherein the influencing includes converting the signal to activate and influence the first surroundings sensor system, and the influence depends on the signal and on the first surroundings sensor system itself, including a model of a sensor of the first surroundings sensor system, a sensor type, and an arrangement of the first surroundings sensor system on the vehicle.

2. The method of claim 1, further comprising:
   transmitting sensor data values to the external processing unit, wherein the sensor data values represent an effect of the influence of the first surroundings sensor system.

3. The method of claim 1, wherein the at least one second surroundings sensor system is identical to the first surroundings sensor system.

4. The method of claim 1, wherein the influence of the first surroundings sensor system includes at least partially switching off the first surroundings sensor system.

5. The method of claim 1, wherein the signal depends on a comparison with the at least one second surroundings sensor system carried out according to predefined criteria.

6. The method of claim 1, wherein the signal depends on a comparison with the at least one second surroundings sensor system carried out according to predefined criteria so that the quality of the first surroundings sensor system and the at least one second surroundings sensor system is taken into account.

7. The method of claim 6, wherein the quality of the first surroundings sensor system and the at least one second surroundings sensor system is taken into account based on the first surroundings data values and the second surroundings data values.

8. A device for operating a first vehicle, comprising:
   a receiver; and
   a controller configured to perform the following:
      receiving, via the receiver, a signal from an external processing unit for influencing a first surroundings sensor system of the first vehicle;

influence the first surroundings sensor system based on the signal;

receiving, via the receiver, surroundings data values detected by at least one second surroundings sensor system of a second vehicle and that at least partially represent surroundings of the first vehicle; and controlling operation of the first vehicle dependent on the influence of the first surroundings sensor system and received surroundings data values;

wherein evaluation of a quality of the first surroundings sensor system and of the second surroundings sensor system includes combining first surroundings data values with second surroundings data values, and forming based thereon, third surroundings data values that represent shared surroundings of the first vehicle and of the second vehicle, wherein the influencing includes switching off the first surroundings sensor system, so that the first surroundings sensor system does not disruptively affect detection carried out by the second surroundings sensor system, and wherein the influencing includes converting the signal to activate and influence the first surroundings sensor system, and the influence depends on the signal and on the first surroundings sensor system itself, including a model of a sensor of the first surroundings sensor system, a sensor type, and an arrangement of the first surroundings sensor system on the vehicle.

9. The device of claim 8, further comprising:
a transmitter to transmit sensor data values to the external processing unit, wherein the sensor data values represent an effect of the influence of the first surroundings sensor system.

10. The device of claim 8, wherein the at least one second surroundings sensor system is identical to the first surroundings sensor system.

11. The device of claim 8, wherein the influence of the first surroundings sensor system includes at least partially switching off the first surroundings sensor system.

12. The device of claim 8, wherein the signal depends on a comparison with the at least one second surroundings sensor system carried out according to predefined criteria.

13. The device of claim 8, wherein the signal depends on a comparison with the at least one second surroundings sensor system carried out according to predefined criteria so that the quality of the first surroundings sensor system and the at least one second surroundings sensor system is taken into account.

14. The device of claim 13, wherein the quality of the first surroundings sensor system and the at least one second surroundings sensor system is taken into account based on the first surroundings data values and the second surroundings data values.

* * * * *